United States Patent
Auld et al.

(10) Patent No.: US 6,548,128 B2
(45) Date of Patent: Apr. 15, 2003

(54) DECORATIVE EMBLEMS HAVING AN EMBEDDED IMAGE OR DESIGN WITH AN ENHANCED DEPTH OF VISION AND METHOD OF MAKING SAME

(75) Inventors: Daniel L. Auld, Columbus, OH (US); Michael W. Kaumeyer, Lancaster, OH (US)

(73) Assignee: The Auld Company, Columbus, OH (US)

( * ) Notice: Subject to any disclaimer, the term of this patent is extended or adjusted under 35 U.S.C. 154(b) by 44 days.

(21) Appl. No.: 09/819,333

(22) Filed: Mar. 28, 2001

(65) Prior Publication Data

US 2002/0142111 A1 Oct. 3, 2002

(51) Int. Cl.[7] ................................................ A47G 1/12
(52) U.S. Cl. ........................... 428/13; 428/14; 428/31; 428/40.1; 428/41.8; 428/354; 428/457; 428/542.2
(58) Field of Search .................... 428/31, 354, 41.8, 428/40.1, 13, 14, 457, 542.2; D5/63; D11/112; D12/163, 164; 40/1.5, 626, 591

(56) References Cited

U.S. PATENT DOCUMENTS

| | | |
|---|---|---|
| 3,312,197 A | 4/1967 | Smith |
| 3,660,211 A | 5/1972 | Brody |
| 4,067,947 A | 1/1978 | Miori |
| 4,087,570 A | 5/1978 | Beinbrech |
| 4,100,010 A | 7/1978 | Waugh |
| 4,139,654 A | 2/1979 | Reed |
| 4,481,160 A | 11/1984 | Bree |
| 4,520,053 A | 5/1985 | Marentic |
| 4,877,657 A | 10/1989 | Yaver |
| 5,480,688 A | 1/1996 | Kaumeyer |
| 6,071,621 A | 6/2000 | Falaas et al. |

Primary Examiner—Deborah Jones
Assistant Examiner—Abraham Bahta
(74) Attorney, Agent, or Firm—Killworth, Gottman, Hagan & Schaeff, L.L.P.

(57) ABSTRACT

A decorative emblem with an enhanced depth of vision is provided. The decorative emblem comprises a decorative substrate, at least one layer of transparent plastic material formed on the top surface of the decorative substrate, and image or design printed on the substantially flat surface of the layer of plastic material, and a transparent plastic overlay flow coated over the image or design, the transparent plastic overlay has radiused edges to give an enhanced depth of vision to the decorative emblem by creating a lens effect and providing a floating appearance to the image or design.

9 Claims, 2 Drawing Sheets

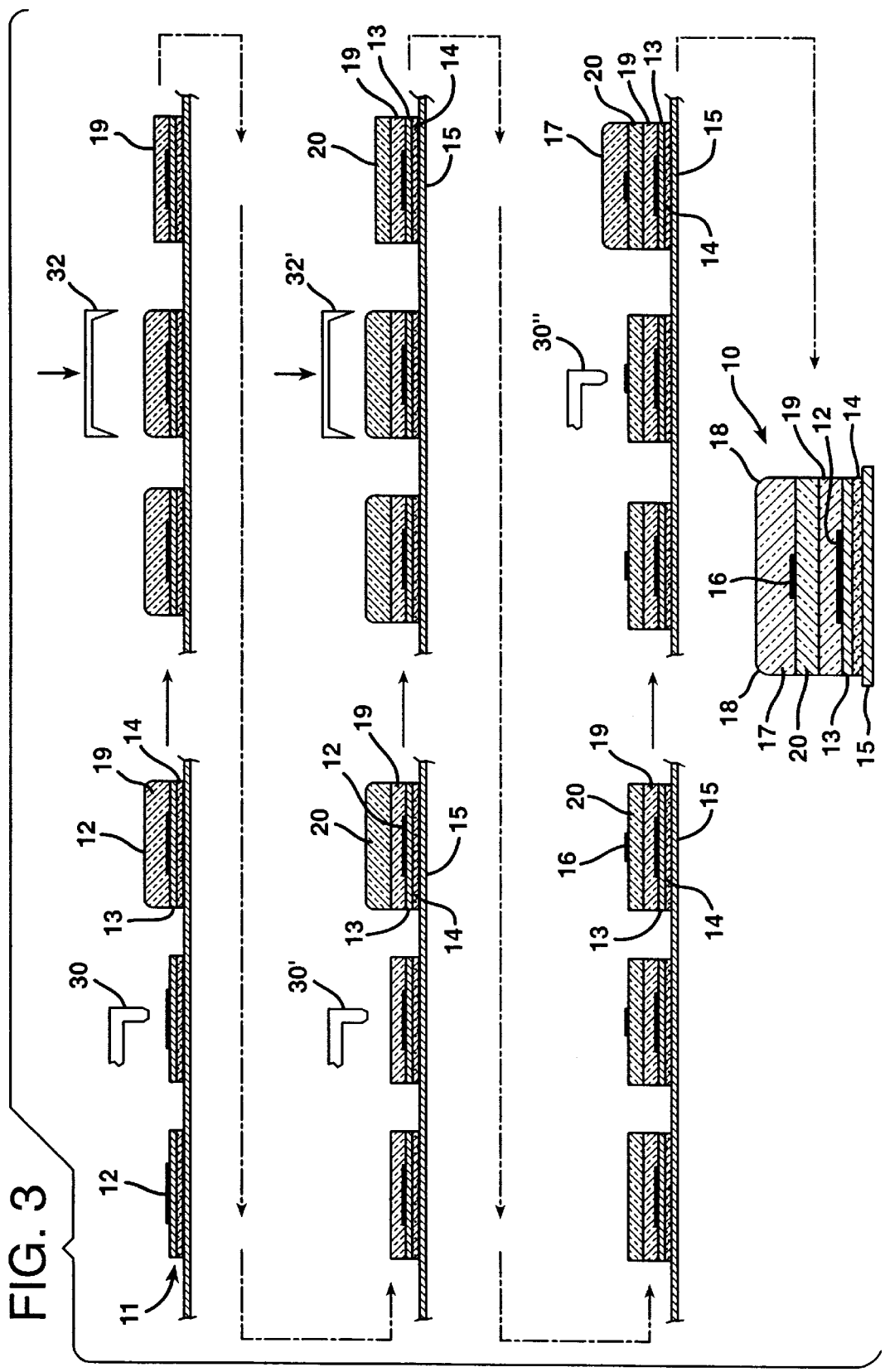

DECORATIVE EMBLEMS HAVING AN EMBEDDED IMAGE OR DESIGN WITH AN ENHANCED DEPTH OF VISION AND METHOD OF MAKING SAME

BACKGROUND OF THE INVENTION

This invention relates to decorative emblems and methods of making them, and more particularly to decorative emblems having an embedded image or design with an enhanced depth of vision and a method for making same.

Decorative emblems are widely used throughout a number of industries including the automotive and appliance industries. Recently they have been also used to apply logos to and/or to enhance the appearance of shoes, gloves, musical instruments, golf clubs and other articles of commerce. In the past, such emblems were formed by flowing a colored vitreous frit into a bronze substrate and firing it at 1250° F. The glass-like vitreous enamel served to beautify the product and protect the decorative emblem from weathering. Today, plastics are primarily used for making such emblems. Thus in Waugh, U.S. Pat. No. 4,100,010, there is disclosed a process of producing decorative emblems by casting a plastic material onto decorative foil shapes to form a meniscus which when cured gives a lens effect to the top surface of the foil. See also U.S. Pat. Nos. 4,087,570 and 4,139,654.

Another version of the Waugh type decorative emblem, where the cured plastic resin is integral with the bezel, is shown in Bree U.S. Pat. No. 4,481,160. There, after an initial casting of a measured amount of plastic onto the base of the bezel, the foil is inserted and seated. A second cast of plastic forms a cap contiguous with the sides of the bezel and encapsulates the foil and bonds it within the bezel. Upon curing, the plastic cap gives a lens effect to the decorative emblem. In an alternative embodiment, a decorative foil shape is placed directly onto the base of the bezel, and a fluent, curable plastic material is cast thereon. As the plastic material cures, it migrates around the edges and under the foil to at least partially encapsulate the foil and bond it within the bezel.

Also known generally is the concept of encapsulating an article in plastic by casting, partially curing, inserting the article, casting again, and completing the cure. For example, in Brody, U.S. Pat. No. 3,660,211, the article is a metal foil of a multicolored iridescent body embedded between two layers of a polyester resin; in Smith, U.S. Pat. No. 3,312,197, the article is a facsimile of a coin embedded between a transparent and an opaque, colored plastic resin material; and in Miori, U.S. Pat. No. 4,067,947, the article is embedded between two different layers of plastic resin material.

While encapsulated foils and articles thus exist, they lack a fill depth of vision which gives the embedded object the appearance of "floating" in space. The only prior art patent known to applicants which address the issue of depth of vision is Yaver U.S. Pat. No. 4,877,657. That patent discloses a decorative trim strip with enhanced depths of vision. The trim strip comprises an elongated transparent or translucent core of a plastic material. A bottom surface of the core is covered with an opaque layer and an adhesive layer. A top surface of the core has a thin covering of a metal having a mirror-like appearance with selected portions removed so that a pattern of the underlying opaque layer is revealed. A transparent plastic overlay is formed over the top covering of metal. The overlay has radiused edges to give enhanced depth of vision to the trim strip. Still the depth of vision obtained is not one where a "floating" image or design is perceived.

Accordingly, the need remains for decorative emblems which have an embedded image or design with an enhanced depth of vision.

SUMMARY OF THE INVENTION

The present invention meets that need by providing a decorative emblem having an embedded image or design with an enhanced depth of vision in the form of a layered composite. The first layer of the layered composite is a substrate preferably having an adhesive, such as a pressure sensitive adhesive, and a release film on its bottom surface; although, other attachment mechanisms may be used. The top surface, then, has a decorative pattern, which may be screen printed, on it to form a decorative substrate.

The substrate may be a metal foil, metallized plastic film, plastic, paper film or other material. Over the decorative pattern on the top surface of the substrate is at least one layer of transparent plastic material which has a substantially flat top surface. By transparent plastic material it is meant a plastic material through which an image is visible, even though it may be tinted or colored plastic, as well as clear plastic. The layer of plastic material is preferably a flow coated polyurethane which is die cut to form a substantially perpendicular edge around the periphery of the layer of plastic material, or "hard edge," for the purpose of creating a domed lens cap when the transparent plastic overlay, which may also be a polyurethane, is, then, flow coated over the layer of plastic material.

However, before that is done an image or design is printed, preferably by screen printing, or similar type of printing method such as, pad printing or hot stamping on the substantially flat top surface of the layer of plastic material. When the transparent plastic overlay is formed with its radiused edges, an enhanced depth of vision is given to the decorative emblem. Thus, a lens effect is created which enhances the appearance of the decorative pattern on the decorative substrate and the image or design on the layer of plastic material has the appearance of "floating" above the decorative pattern on the decorative substrate.

It is possible to form multiple layers of plastic material in order to increase the thickness of the base for the printed image or design and, thus, create a greater distance between the image or design and the decorative pattern on the decorative substrate. Alternatively, an image or design can be printed on the substantially flat surface of each layer of plastic material to give a multiple floating image/domed lens effect.

Accordingly, it is an object of the present invention to provide decorative emblems having an embedded image or design with an enhanced depth of vision and unique aesthetics. It is also an object of the present invention to provide a method of making such decorative emblems. These and other objects and advantages of the invention will become apparent from the drawings, detailed description of the invention, and the appended claims

BRIEF DESCRIPTION OF THE DRAWINGS

FIG. 3 is a schematic view of the stages in the method of making the decorative emblem of the present invention.

DETAILED DESCRIPTION OF THE PREFERRED EMBODIMENTS

The decorative emblem of this invention is a composite of layers and graphics which together give a distinct and aesthetically pleasing article. The decorative emblem is particularly useful in applying logos, trademarks, decorations or other images or designs to all kinds of articles of commerce from appliances to footwear. With its enhanced depth of vision and lens effect, the decorative emblem of the present invention offers a number of eye catching advantages in that regard. The individual layers of the layered composite which form the decorative emblems are described in detailed below as well as methods of production.

Figure 1:
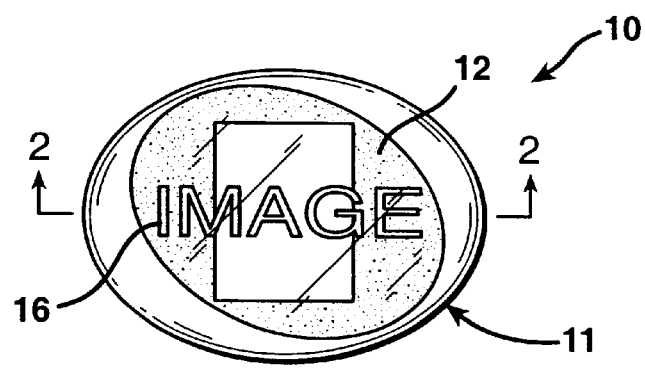
FIG. 1 is a front view of the decorative emblem of the present invention.
Figure 2:
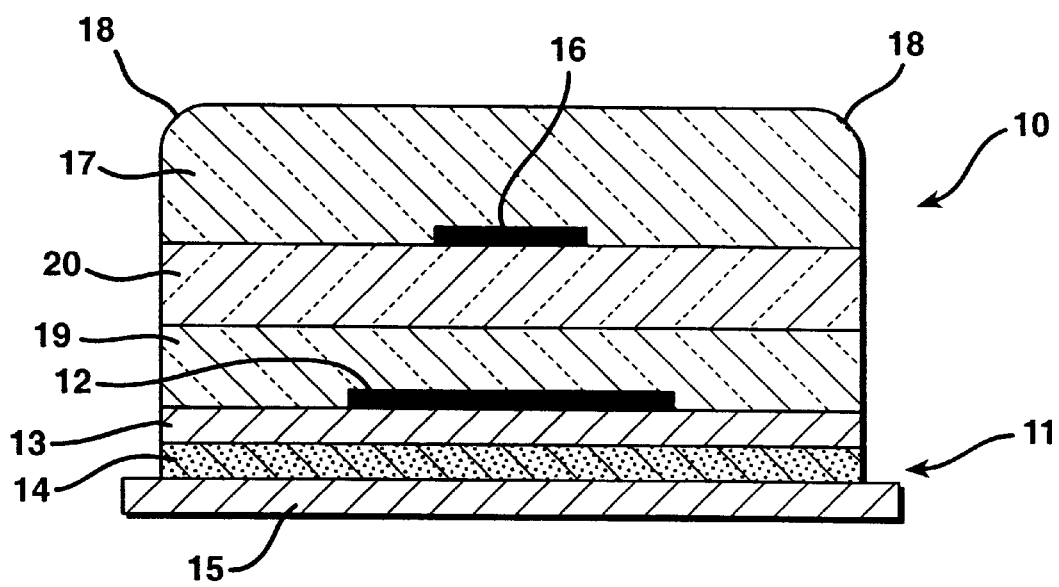
FIG. 2 is a cross-sectional view of the decorative emblem of the present invention.

With reference to FIGS. 1–2, there is shown a decorative emblem 10. While oval it can be produced in virtually any shape or size, dictated only by the substrate to which it will be applied. As shown the decorative emblem 10 has two layers of plastic material 19, 20, in order to give a thicker decorative emblem and demonstrate that alternative embodiment; although, generally a single layer of plastic material is preferred. When a single layer is used the decorative emblem will have a thickness of typically 0.047–0.182 inch; when two layers are used as shown it will have a typical total thickness of 0.067–0.252 inch; when three layers are used it will have a thickness of 0.087–0.322 inch, etc.

The substrate assembly 11 is made up of a substrate 13, an adhesive 14, and a release liner 15 as shown in FIG. 2. The substrate assembly is usually the starting material for the coating and printing process as shown in FIG. 3 and as further described below. The substrate 13 is preferably made of metal, paper, plastic or metallized plastic. Further a thin aluminum foil or a metallized polyester (Mylar) film is especially preferred. A pressure sensitive adhesive layer 14 is shown in FIGS. 2 and 3. Such adhesives are commercially available and widely used. Other adhesives such as a heat activated adhesive can as well be used. Preferably, a release liner 15 is used to protect the adhesive 14 after production and prior to use. Wax paper and silicone release paper are commonly used for this purpose.

A decorative pattern 12 is screen printed on substrate 13 to form a decorative substrate. As mentioned previously, alternatively, the decorative pattern 12 (as well as design 16) can be applied by pad printing or hot stamping or similar techniques. Over decorative pattern 12 is at least one layer of plastic material, and in the embodiment shown two layers of plastic material 19, 20 are used. Preferably a transparent, flexible plastic is used. A highly preferred plastic material having a good blend of all the aforementioned properties is a polyurethane. Various known polyol and polyisocyanate reactants are used to form the polyurethane. One polyurethane that is particularly useful is the reaction product of (A) a mixture of a polyester glycol and low to medium molecular weight polypropylenetriols and (B) and aliphatic diisocyanatepolypropylenetriol adduct. After mixing (A) and (B) the mixture is cast onto the decorative substrate.

At least the top layer of plastic material has an image or design 16 screen printed on it. This is as shown in FIG. 2 where image or design 16 is shown on a layer of plastic material 20. Alternatively, an image or design may be printed on each layer of plastic material in order to give a multiple floating image effect. That is, after the transparent plastic overlay 17 is applied, image or design 16 is embedded between the plastic overlay 17 and the layers of plastic material 19, 20. And it "floats" over the decorative pattern 12 on decorative substrate 13. Multiple layers of plastic material and multiple images or designs will, then, give a multiple floating image effect.

The transparent plastic overlay has radiused edges 18 as seen in FIG. 2. The overlay is preferably applied by casting a sufficient, controlled, amount of liquid plastic on the surface of layer of plastic material 20 to cause it to flow to the edges of the layer of plastic material 20 where it stops and forms a positive meniscus. The liquid plastic overlay may be cured to a solid by application of heat or irradiation, such as UV irradiation.

The plastic overlay must possess a number of physical properties based on its expected use and exposure. Thus, the overlay is ideally weather-resistant, non-yellowing, abrasion-resistant and impact resistant. Additionally, the plastic overlay can be flexible so that the decorative emblem is flexible. Thus a flexible polyurethane similar to that used for the layers of plastic material 19, 20 can be used for the transparent plastic overlay 17.

In one embodiment, a relatively soft, flexible, water-resistant polyurethane generally characterized by a Shore A hardness in the range of approximately 75 to approximately 95 and preferably approximately 85 to approximately 95, a specific gravity in the range of approximately 1.02 to approximately 1.08, preferably approximately 1.06, and a gel time in the range of approximately 4 to approximately 7 minutes, preferably approximately 5 minutes is used. Such polyurethanes are known and various ones can be used in the present invention. One that is particularly useful is the reaction product of (A) a mixture of a polyester glycol and low to medium molecular weight polypropylenetriols and (B) an aliphatic diisocyanatepolypropylenetriol adduct discussed above.

Preferably, a suitable catalyst is added to the "A" component to aid in curing. The addition of the catalyst promotes a slow cure at room temperature so as to allow full flow of the liquid polyurethane to the edges of the substrate before setting.

Prolonged exposure to sunlight may fade or damage the decorative pattern 12 on the surface of substrate 13 and/or image or design 16. Although the plastic lens cap by itself will repel an amount of UV radiation thereby prolonging the life of the substrate surface, preferably a UV absorbing compound is added to component "A" of the reaction mixture. The presence of an UV absorber further reduces the amount of harmful radiation which reaches the substrate surface. Suitable UV absorbers include benzothenone UV screeners. A typical benzothenone UV screener is available under the tradename TINUVUN is available from Ciba-Geigy Corp. of Ardsly, N.Y.

Additionally, the plastic lens cap also preferably contains an antioxidant compound. An antioxidant aids in preventing the plastic lens cap from yellowing or discoloring with age and, thus, prolongs the life of the substrate. Suitable antioxidants for the present invention include hindered amines. A typical hindered amine useful in the present invention is available under the tradename IRGANOX and is available from Ceba-Geigy Corp. of Ardsly, N.Y.

The shape of the overlay is such that it imparts a lens effect to the decorative emblem. That is, the curvature of the edges optically enhances the decorative surface when viewed through the overlay. An enhanced depth of vision of the decorative emblem results from clear plastic lens cap which materially adds to the appeal of the underlying layers and graphics in an unexpected manner.

A method for preparing the decorative emblem of the present invention is illustrated in FIG. 3. The method typically involves providing a substrate sheet metallized film. An acrylic adhesive is then applied to the bottom surface of the substrate followed by bonding to a release liner. Preferably, the decorative substrate is 0.002–0.007 inch, the acrylic adhesive layer 0.002–0.005 inch and the release liner 0.003–0.005 inch thick. An alternative to use of acrylic adhesive would be, for example, an adhesive foam tape of 0.010–0.060 inch thick.

The substrate assembly 11, i.e. substrate 13, adhesive 14 and release liner 15, is printed, preferably with a screen printing technique, to provide a series of decorative patterns 12, on each sheet of substrate assembly 11. Before casting of the plastic material, the edges of the substrate should preferably have a clean or sharp cut edge to create an effective edge. By effective edge it is intended to mean one that will create sufficient surface tension to create a positive meniscus effect on the edges of the substrate with the plastic composition.

The effective edge is provided in the preferred method by passing the printed assembly through a kiss-cut process in registry with the decorative patterns. In the kiss-cut process, a sharply defined edge is cut through the substrate and adhesive layers around the perimeter of each of the printed patterns on the assembly. The cut does not, however, penetrate the release liner sheet. By removing the selvage of substrate, a series of discrete emblem-shaped substrates having a decorated surface are provided on the release liner.

Alternatively, a first layer of plastic material may be coated, such as by flood coating, on the substrate prior to forming the effective edge by, for example, kiss cutting through the plastic, substrate and adhesive, but not the release liner. Since an effective edge is only necessary for formation of the domed lens cap, it is possible to coat a first layer of plastic, print, coat a second layer of plastic, etc., and only kiss cut immediately preceding the final application of the domed lens cap.

In any event, the substrate surface on which the plastic is to be cast should be free from moisture, grease, dust and other foreign matter. The assembly preferably should be held substantially flat and horizontal. A substantially flat or level surface allows for a smooth, even distribution of plastic material over the substrate surface. The substrate can be held flat and horizontal by any suitable means, such as, for example, by means of a vacuum being created underneath the assembly.

The plastic material 19 is deposited onto the substrate surface as a fluent, liquid composition from a dispensing device such as casting head 30. The dispensing device can be any known device suitable for such a purpose. Examples of a suitable casting head of the present invention include a single nozzle capable for smaller area decorative emblems or multiple nozzles covering the entire substrate surface area for larger area decorative emblems. The flow of plastic composition from and location of the nozzle or nozzles, can be effected either manually or automatically operated. A suitable casting head and apparatus can be found in U.S. Pat. No. 4,356,617 to Coscia, the disclosure of which is herein incorporated by reference.

The substrate assembly 11 with decorative pattern 12 and plastic material 19 on it is then trimmed again by cutting knife 32 to produce a sharply defined edge on material 19. Should an additional layer of plastic material 20 be desired, the plastic deposition process is repeated using casting head 30' and cutting knife 32'. An image or design 16 is then screen printed on the upper surface of layer of plastic material 20 and casting head 30" used to flow coat the plastic overlay 17 having radiused edges 18, as shown, to produce decorative emblem 10.

In this way there is produced a decorative emblem having an embedded image or design 16 which appears to float above the decorative pattern 12 on substrate 13. It has an enhanced depth of vision by reason the lens effect from transparent plastic overlay 17 and otherwise offers a truly unique and aesthetically pleasing decorative emblem.

While the article and method herein described constitute preferred embodiments of the invention, it is to be understood that the invention is not limited to this precise article and method, and that changes may be made therein without departing from the scope of the invention.

What is claimed is:

1. A decorative emblem having an embedded image or design with an enhanced depth of vision comprising a layered composite of:
   a) a substrate having a top surface and a bottom surface,
   b) at least one layer of transparent plastic material on said top surface of said substrate, said layer of plastic material having a substantially flat top surface,
   c) an image or design printed directly on said substantially flat top surface of said layer of plastic material, and
   d) a transparent plastic overlay covering said image or design, said overlay characterized in having radiused edges so as to give an enhanced depth of vision to the decorative emblem by creating a lens effect and providing a floating appearance to said image or design.

2. The decorative emblem of claim 1 further including an adhesive layer on said bottom surface of said substrate.

3. The decorative emblem of claim 2 wherein said adhesive layer is a pressure sensitive adhesive and further including a release film over said adhesive layer.

4. The decorative emblem of claim 1 wherein said substrate has a decorative pattern on its top surface.

5. The decorative emblem of claim 4 wherein said substrate is a metallized plastic film.

6. The decorative emblem of claim 4 wherein said substrate in a metal foil.

7. The decorative emblem of claim 4 where in said plastic overlay is a polyurethane resin.

8. The decorative emblem of claim 7 wherein said plastic material is a polyurethane resin.

9. The decorative emblem of claim 1 wherein there are multiple layers of plastic material, each having a substantially flat top surface, and each having an image or design printed directly on that substantially flat top surface.

* * * * *